June 18, 1946.  W. H. HUENERGARDT  2,402,163

AUTOMATIC HEAT CONTROL APPARATUS

Filed Dec. 4, 1944  4 Sheets-Sheet 1

INVENTOR.
WILLIAM H. HUENERGARDT.
BY Harry C. Heentz
ATTORNEY.

June 18, 1946.   W. H. HUENERGARDT   2,402,163
AUTOMATIC HEAT CONTROL APPARATUS
Filed Dec. 4, 1944   4 Sheets-Sheet 4

INVENTOR.
WILLIAM H. HUENERGARDT.
BY *Harry P. Deents*
ATTORNEY.

Patented June 18, 1946

2,402,163

UNITED STATES PATENT OFFICE 2,402,163

AUTOMATIC HEAT CONTROL APPARATUS

William H. Huenergardt, Chicago, Ill.

Application December 4, 1944, Serial No. 566,558

18 Claims. (Cl. 219—20)

This invention relates to heat timing devices and more particularly to automatic heat control devices, although the teachings thereof may be employed with equal advantage for other purposes.

It contemplates more especially the provision of improved instrumentalities for controlling the application or generation of heat from a period of initial boiling of fluids subjected to heat for processing into edibles or other compositions within the dictates of commercial practice.

A fundamental application of the teachings of the invention is shown in connection with a known method of making coffee. With such a coffee maker, the product is completed and ready for serving within a matter of a few minutes after the water boils. With the commencement of boiling, there is a resultant vibration serving as the impulse medium for the period of timing or continued application of heat. This vibration is translated to a sensitive timing instrumentality that is responsive thereto for operating valve or switching means in circuit with the heat generator. This illustrates the fundamentals of controlling the application of heat in accordance with the teachings of the present invention.

One object of the present invention is to provide an improved type of heat timing device for automatically controlling the application of heat in the processing of substances therewith.

Another object is to simplify the construction and improve the operation of devices of the character mentioned.

Still another object is to provide substance boiling responsive means to time the extent or effect the termination of boiling as the occasion may require or dictate.

A further object is to provide an improved substance boiling responsive timer that may be preset to any particular requirements therefor.

A still further object is to provide an improved boiling vibration responsive device for timing the continued application of heat to the substance being heat processed therewith.

Still a further object is to provide improved automatic timing instrumentalities for processing coffee and like products utilizing a fluid as a constituent thereof.

Other objects and advantages will appear from the following description of an illustrative embodiment of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a circular base plate 10 to which mounting posts 11, in this instance three, are anchored to pivotally support confronting arms 12—13 comprising part of a cradle which is to register the vibrations of the heat generator and coffee maker operatively connected therewith. To this end, the cradle arm 12 is a substantially flat T-shaped plate in the horizontal plane having mounting fingers 14—15 extending therefrom to pivotally engage pins 16—17, the former connected to a post 11 and the latter carried by a bracket plate 18 comprising a part of an escapement mechanism 19 to be hereinafter described.

The cradle arm 13 has its flat surface in the vertical plane and presents furcations 20 in its edge 21 (Figure 7) to pivotally receive the edge 22 of the cradle arm 12. The cradle arm 12 is normally urged upwardly in a counterclockwise direction (viewed from Figure 7) by a compression spring 23 having the top end retained by a depending pin 24 anchored proximate the edge 22 of the cradle arm 12 with the lower end of the spring 23 anchored to the base plate 10. As shown, the cradle arm 13 terminates in a plate 25 disposed normal thereto to present confronting ears 26—27 which are pivotally connected to the aligned posts 11 (Figure 6) by a rod 28 extending therethrough. Consequently, the cradle arms 12—13 normally converge upwardly under the urge of the spring 23, and has a vertical maximum vibration responsive stroke at their fulcrum line of contact 29 within the limits of a suitable stop such as an annular groove 30 provided near the top end 31 of a vertical post 32.

The vertical post 32 is anchored to the base plate 10 in a position wherein the annular groove 30 receives an edge 33 of the cradle 12—13 which will abut against the spaced shoulders defined by the annular groove 30, the vertical width of which is commensurate with the predetermined maximum loading capacity of the filled vessel and the heating element supported thereon as will appear more fully hereinafter. The loading capacity of the cradle 12—13 is a factor of the strength of the spring 23 and the size and sensitivity of the vibration responsive mechanism. This can be varied within a wide range depending upon the dictates of commercial practice.

Figure 6:
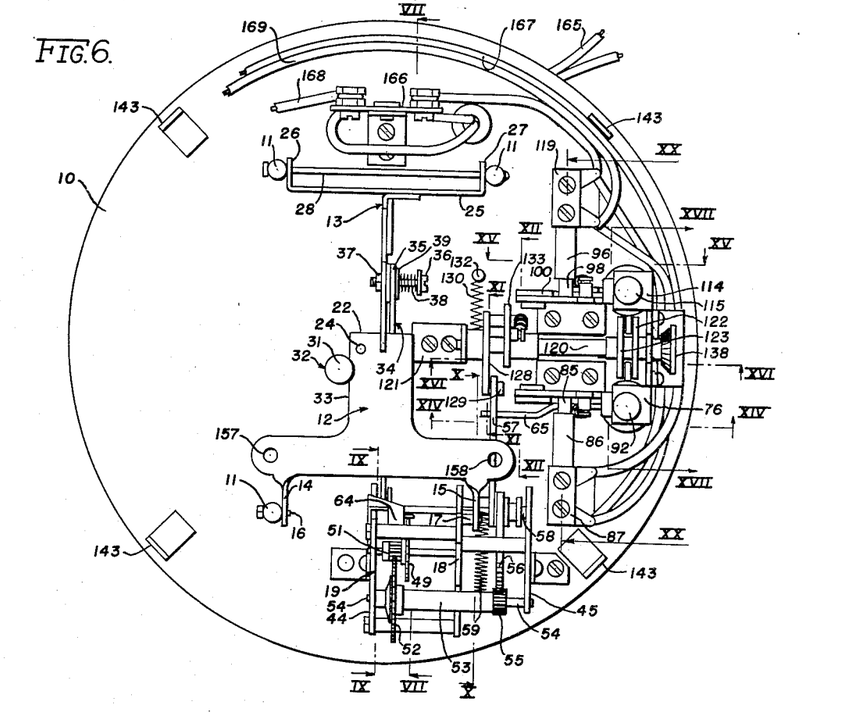
Figure 6 a top plan view of the device with the heating element and casing removed to clarify the showing.
Figure 7:
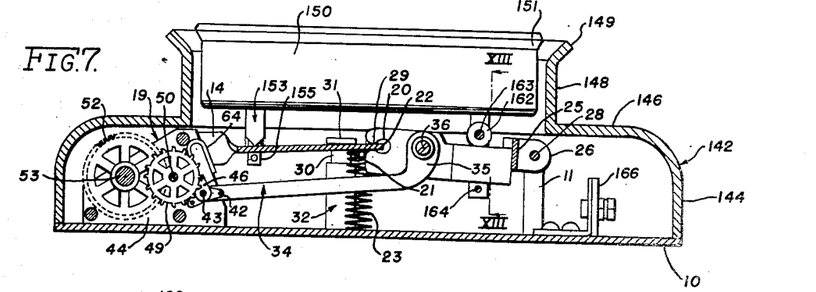
Figure 7 is a sectional view in elevation of the device taken substantially along line VII—VII of Figures 2 and 6.

The vibration responsive movement of the cradle through its component pivotal arms 12—13 is transferred to a lever 34 having an upwardly offset ear 35 through which a spring mounted threaded stud 36 extends for frictional retention on the cradle arm 13 by a threaded fastener nut 37 (Figure 6). A spring 38 and washers 39 on the stud 36 frictionally applies the lever ear 35 for movement with and relative to the cradle arm 13 so that the lever 34 will automatically preset itself responsive to the weight of the heating element and loaded vessel on the cradle arms 12—13 as will appear more fully hereinafter. The lever ear 35 has, however, just enough friction with the cradle arm 13 to operate the timing mechanism connected therewith without slippage in the friction connector 36—38—39. The lever 34 extends to any suitable timing and heat control mechanism which, in this instance, is an escapement mechanism 19 to be presently described.

To this end, the lever 34 terminates in a furcated extremity presenting an open slot 40 (Figure 9) which receives a pin 41 carried by a small bell crank arm 42. The bell crank arm 42 is fixed to a stub shaft 43 journalled between the center bracket plate 18 and outside bracket plate 44 of the escapement mechanism 19. Another outside bracket plate 45 cooperates in supporting the escapement mechanism 19.

Figure 10:
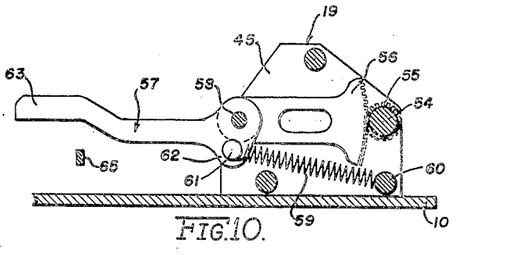
Figure 10 is a sectional view in elevation of the pre-setting mechanism taken substantially along line X—X of Figure 6.

The stub shaft 43 carries a double arm 46 carrying pins 47—48 serving as pawls cooperating with an escapement or ratchet wheel 49 fixed to another stub shaft 50 journalled between the bracket plates 18—44. The escapement wheel 49 has a pin wheel gear or pinion 51 fixed thereto for meshing engagement with a gear 52 frictionally carried by an elongated shaft 53 terminating in reduced extremities 54. The shaft 53 is journalled on its extremities between the outside bracket plates 44—45. The shaft 53 carries a pinion 55 which meshes with a gear sector 56 (Figure 10) having an extended trip lever 57 fixed thereto so that both sector 56 and lever 57 are mounted to a stub shaft 58 journalled between bracket plates 18—45.

The gear sector 56 and the trip lever 57 extend on opposite sides of the shaft 58, and are normally urged as a unitary element in a counterclockwise direction (viewed from Figure 10) by a spring 59. The spring 59 is anchored at one extremity to a stud shaft 60 fixed between the bracket plates 18—45 proximate to the base plate 10 so that the other spring extremity will engage a pin 61 fixed to an offset ear 62 comprising part of the lever 57 to which the stub shaft 58 is attached. Consequently, the lever 57 with its upper vertically offset free extremity 63 is normally urged downwardly toward the base plate 10 to exert a constant movement urge to the gear wheel 52, pinion 51, and escapement wheel 49 which is controlled by the double pawl pins 47—48 normally serving as stops therefor. A curved strap 64 is fixed to the bracket 44 to project into the path of the upper pawl pin 47 to adjust and limit the latter's inward stroke for insuring the sensitive operation of the wheel 49 responsive to the shortest possible strokes of the lever 34.

The pivotal movement of the double arm pawl 46 is controlled by the vibration, jiggling, or up and down movement of the cradle 12—13 which in turn is actuated by the turbulence set up in boiling liquids and the like. These vibrating effects govern the permitted rotary movement of the gear wheel 52, pinion 51 and escapement wheel 49 that determines the extent of downward displacement of the trip lever 57. The trip lever 57 is initially set to assume an extreme clockwise position (viewed from Figure 10) which simultaneously sets, tensions or loads the escapement mechanism operating spring 59. Thus the timing mechanism is loaded each time the instrumentalities are pre-set to initiate any particular heat generation and application for processing therewith.

Figure 14:
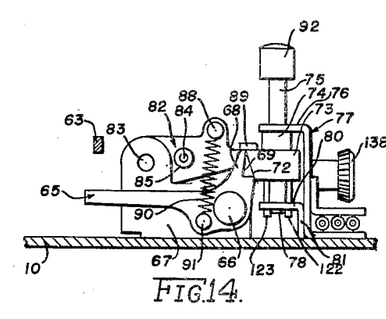
Figure 14 is a fragmentary sectional view taken substantially along line XIV—XIV of Figure 6.

As the trip lever extremity 63 reaches the terminus of its counterclockwise displacement (viewed from Figure 10), it displaces a lever 65 pivoted as at 66 to an upstanding base attached bracket plate 67 (Figure 14). The lever 65 has a lock arm 68 above the pivot 66 to present a stepped cut-out 69 which provides a top lip or shoulder 70 and a spaced lower friction point 71 for engagement with an inclined surface 72 on a switch actuator hub 73. The hub 73 with a smaller peripheral shoulder 74 is attached to a stem 75 which is guided vertically in a horizontal bracket 76 comprising part of a vertical base attached plate 77. The switch actuator hub 73 has a depending pin 78 which projects downwardly therefrom for vertical guidance in a horizontal bracket 80 which has a vertical offset 81 fixed to the bracket plate 77 (Figure 14).

A switch actuator lever 82 is pivoted to the bracket plate 67 as at 83 to carry a switch terminal actuating pin 84 having an insulator sleeve 85 thereover for contacting normally spaced electric terminals 86, in this instance three, disposed thereabove (Figures 6, 8, and 20) comprising part of a switch block 87. The switch actuator lever 82 carries a spring anchor pin 88 which is disposed above and inwardly of a horizontally offset trip lug 89 disposed in the path of the stepped cut-out 69 presenting the top shoulder 70 and the spaced friction point 71. The trip lug 89 rests on the shoulder 70 in the operative upraised position of the lever 82 corresponding with the electric terminals 86 in closed circuit contact or in the cut-out 69 in its lowermost inoperative position with the electric terminals 86 spaced to break the heating element circuit to be hereinafter described.

Figure 8:
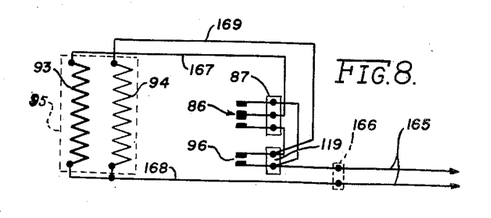
Figure 8 is a diagrammatic wiring diagram of a preferred circuit showing a heating and a warming coil therein.
Figure 18:
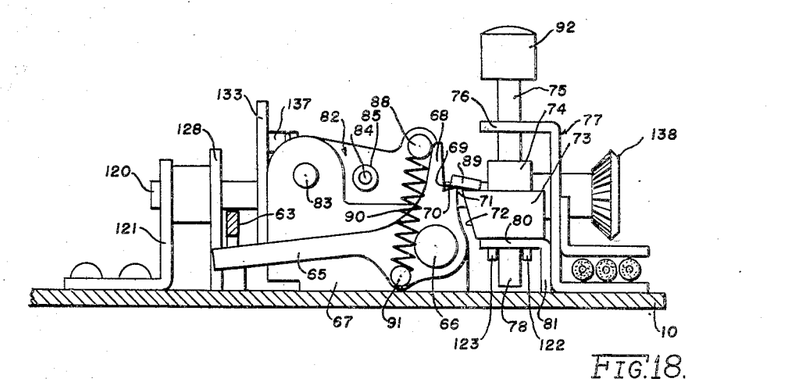
Figure 18 is an enlarged view of Figure 14 with the parts in their opposite position of displacement.

A spring 90 is anchored between the actuator lever pin 88 and a pin 91 fixed to the lever 65 to keep the actuator lever lug 89 in downward engagement with the top lip or shoulder 70 of the lock arm 68. The actuator stem 75 has an appropriately colored button such as a red plastic head 92 fixed to the upper extremity thereof. Consequently, when the pre-set lever 63 displaces the lever 65 downwardly within its operative range to release the friction point 71 from the inclined surface 72 of the stem hub 73, the spring 90 displaces the actuator lever 82 in a clockwise direction (viewed from Figure 14) so that the trip lug 89 descends with the stem hub 73 (Figure 18) to permit the electric terminals 86 to spread (Figure 20) and break the circuit to a heating coil 93 and a warming coil 94 connected in parallel in the circuit therewith (Figure 8).

Figures 1, 2, 3, 4, 5:
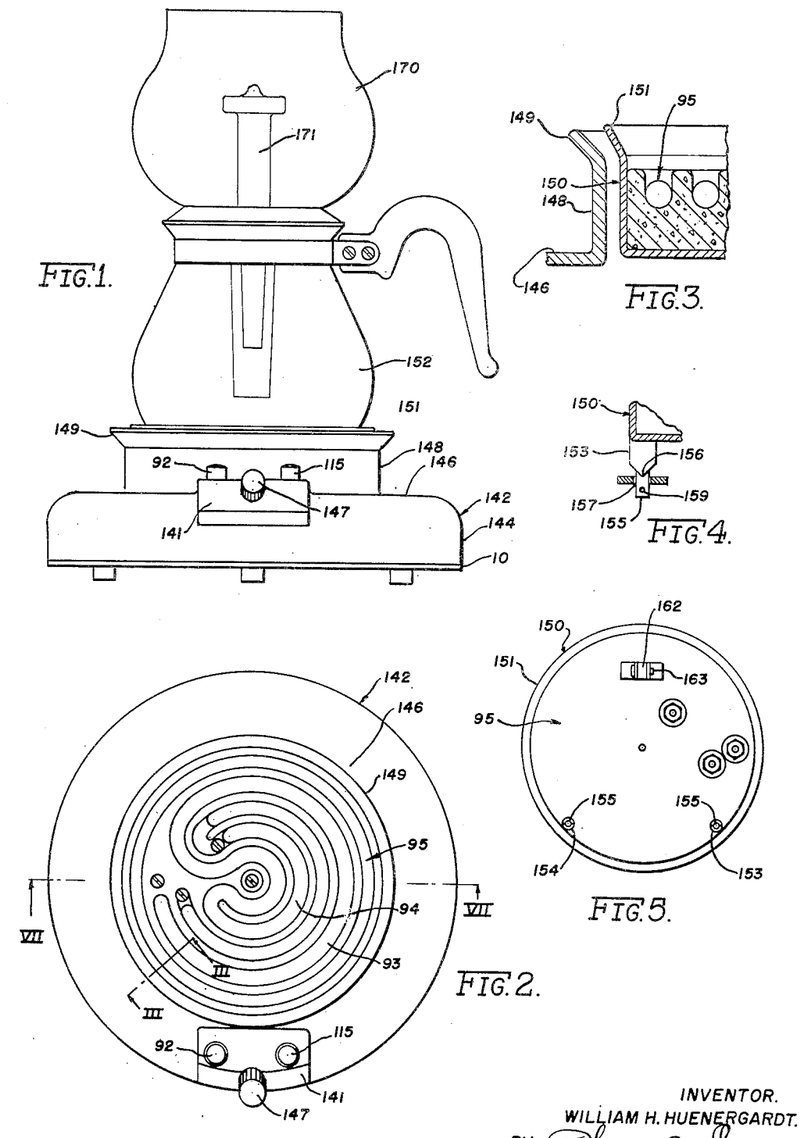
Figure 1 is a front view in elevation of a device embodying features of the present invention.
Figure 2 is a plan view of the device shown in Figure 1 with the coffee maker removed therefrom.
Figure 3 is a fragmentary sectional view taken substantially along line III—III of Figure 2.
Figure 4 is a fragmentary detail sectional view in elevation of the heating element mounting post shown assembled in Figure 7.
Figure 5 is a bottom plan view of the heating element supporting plate.
Figure 15:
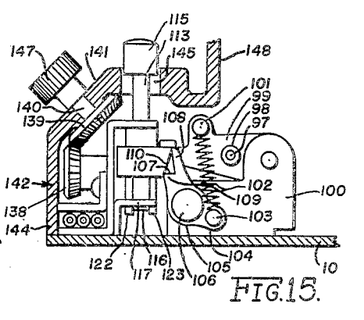
Figure 15 is a fragmentary sectional view taken substantially along line XV—XV of Figure 6.
Figure 16:
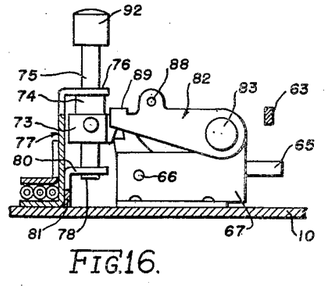
Figure 16 is a fragmentary sectional view taken substantially along line XVI—XVI of Figure 6.
Figure 20:
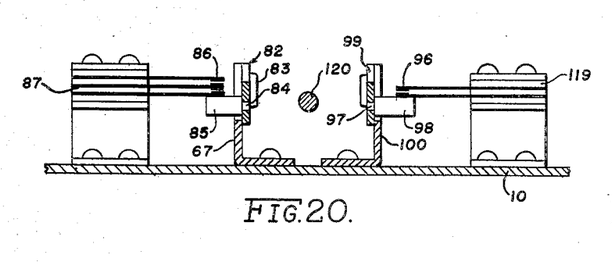
Figure 20 is a sectional view in elevation taken substantially along line XX—XX of Figure 6 with the switch terminal contacts normally open.
Figure 21:
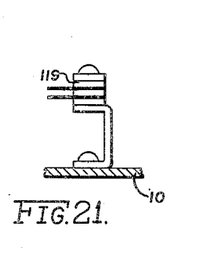
Figure 21 is an end view of the switch block of which a front view is shown in Figure 20 with the base in section.

The switch terminals 86 control the closing and opening of the circuit to both the heater coil 93 and warming coil 94 which together are energized therethrough. The coils 93 and 94 comprise the primary heater element confined in a holder 95 (Figures 2 and 3). The warming coil 94 comprises the secondary heating coil when energized by itself through normally spaced and open electric spring terminals 96 (Figures 6, 8 and 20) for closing through the lifting of a pin 97 having an insulator sleeve 98 thereon (Figures 15 and 20). The pin 97 is anchored to an actuator lever 99 which, in this instance, is manually displaced by mechanism to be presently described. The actuator lever 99 is similar to the actuator lever 82, and is correspondingly pivoted to a base attached bracket plate 100 disposed parallel to the bracket plate 67.

Figure 19:
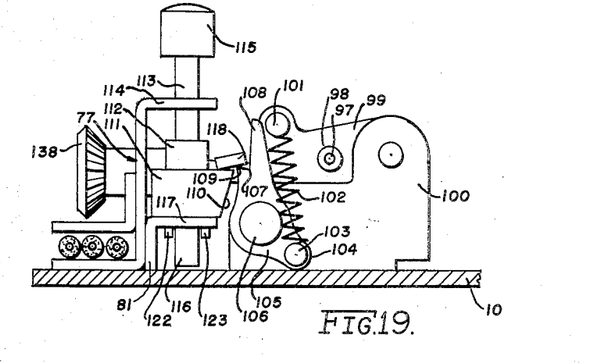
Figure 19 is an enlarged view of Figure 15 with the parts in their opposite position of displacement the casing not being shown in this view.

The actuator lever 99 has a pin 101 attached thereto for anchoring one end of a spring 102 (Figures 15 and 19) with the other end thereof anchored to a pin 103 fixed to an arm 104 of a lever 105 which is pivoted as at 106 to the bracket plate 100 so that the operating end thereof may be provided with a stepped cut-out 107 exactly like the cut-out 69 in the lever 68. Thus a similar top lip or shoulder 108 and a lower spaced friction point 109 to engage the inclined surface 110 of a hub 111 having an upper peripheral shoulder 112 fixed to a vertical stem 113. The stem 113 is vertically guided in a horizontally offset bracket 114 which like the bracket 76 (Figure 6) is part of the base attached plate 77. The stem 113 has a suitably colored finger depressing knob such as a green plastic button 115 fixed to the top extremity thereof to distinguish it from the red button 92 attached to the stem 75. It should be noted that the vertical position of the actuator stems 75—113 serve as signal indicators of the cycle of operation or energization of the coils 93—94 or 94 alone or the total de-energization thereof.

The hub 111 has a depending pin 116 guided through a bracket 117 which like the bracket 80 (Figure 17) is fixed to the base attached bracket plate 81, thereby assisting in reciprocally guiding the hub 111 and its stem 113. A horizontally offset lug 118 extends from the actuator lever 99 to bear downwardly against the lever lip or shoulder 108 in their upward operative position of displacement. This is effected against the urge of the spring 102 with the lever friction point 109 against the hub inclined surface 110 so that the insulator pin 97 will bear upwardly against the electric terminals 96 to maintain their contact and close the circuit to only the warmer coil 94. The normally spread resilient terminals 96 are mounted in an insulator block 119 which like the insulator block 87 for the spring terminals 86, are supported by the base 10.

Figure 17:
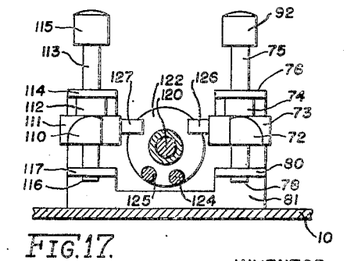
Figure 17 is a fragmentary sectional view taken substantially along line XVII—XVII of Figure 6.

The instrumentalities thus far described are initially set and to some extent controlled by a shaft 120 disposed between the operating stems 75—113 (Figure 17). The shaft 120 is journalled in the base attached bracket 77 and a confronting bracket 121 disposed inwardly near the center of the base 10. The shaft 120 carries closely spaced collars 122—123 which are bridged by fixed pins 124—125 disposed in the path of inwardly directed pins 126—127 extending horizontally from the hubs 73—111, respectively. Thus, counterclockwise rotation of the shaft 120 will elevate the hub 73 and its stem 75 while clockwise rotation thereof (viewed from Figure 17) will elevate the hub 111 with its stem 113 to close the circuit to the primary heating elements 93—94 or to the secondary heating element 94 alone for mere warning purposes.

Figure 9:
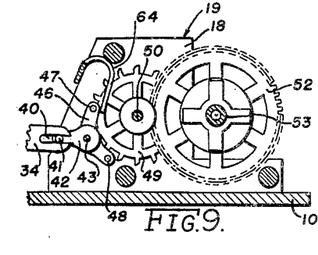
Figure 9 is a sectional view in elevation of the escapement mechanism taken substantially along line IX—IX of Figure 6.

The counterclockwise rotation (viewed from Figure 17) which energizes the primary heating coils 93—94, also pre-sets the escapement setting lever 57—63 and initial tensioning of the escapement propelling spring 59. This is accomplished through a plate sector 128 (Figure 12) which idles on the shaft 120 near the inward supporting bracket 121. The plate sector 128 carries a pin 129 at one end in the path of the pre-set lever offset 63 to elevate it and rotate the gear sector 56 which tensions the spring 59 (Figure 10) and rotates the gear sleeve 53 relative to its frictionally associated gear 52 that remains stationary. This is necessary in that the escapement mechanism does not reverse and thus the frictional mounting of the gear 52 permits the initial setting, loading or tensioning of the spring 59 that tends to operate the timing mechanism. The timing mechanism operation is controlled by the pivotal movement of the double arm escapement lever 46 (Figure 9).

Figure 11:
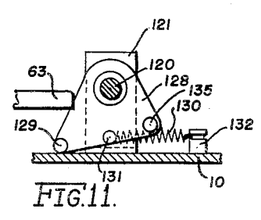
Figure 11 is a fragmentary sectional view of the pre-setting mechanism actuator plate in its initial position taken substantially along line XI—XI of Figure 6.
Figure 12:
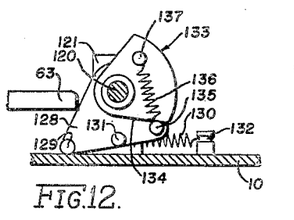
Figure 12 is a fragmentary sectional view of the actuator plate shown in Figure 12 with the spring connected cam plate trip therefor taken substantially along line XII—XII of Figure 6.

The plate sector 128 which idles on the shaft 120, is normally urged in a counterclockwise direction (viewed from Figure 12) by a spring 130 fixed at one end to a pin 131 projecting from the plate sector 128. The other end of the spring 130 is fixed to a pin 132 anchored vertically in the base 10 (Figures 11 and 12). The idling plate sector 128 is rotated by another plate sector 133 fixed to the shaft 120 so that one radial edge 134 will engage a pin 135 projecting from a corner of the plate sector 128 opposite to the corner pin 129 therein. A spring 136 is anchored to the pin 135 while its other extremity is anchored to a pin 137 fixed to the plate sector 133, thereby normally maintaining the plate sector edge 134 against the pin 135 to rotate the otherwise idling plate sector 128 in a clockwise direction (viewed from Figure 12) to elevate the pre-set escapement lever 57—63 while energizing the primary heating elements 93—94 by closing the switch 86.

When the shaft 120 is rotated in a counter-clockwise direction (viewed from Figures 11 and 12) or a clockwise direction (viewed from Figure 17) to close switch 96 and energize the warming coil 94, the plate sector 128 remains stationary in the position shown in Figure 11, and the plate sector 133 rotates with the shaft 120 to tension the spring 136 without any other effect. To the end of conveniently rotating the shaft 120 in one direction or another, a gear 138 is fixed to its forward extremity to mesh with a bevel gear 139 fixed to a stud shaft 140 journalled in an angular portion 141 of a casing 142. The casing 142 covers the instrumentalities and engages upstanding flanges 143, in this instance four, which are anchored to the base plate 10 to provide threaded engagement for machine screws that extend through the side wall 144 of the casing 142 to connect with threaded apertures in the flanges 143.

The manual depressing buttons 92—115 project through openings 145 in the horizontal ring portion 146 of the casing 142 to enable the primary heating elements 93—94 to be manually de-energized by the primary heating elements 93—94 to be manually de-energized by depressing the button 92 or to de-energize the warming coil 94 by depressing the button 115 after the switch 96 has been closed by the manual rotation of the shaft 120 through manual rotation of a knob 147 (Figure 15) fixed to the stud shaft 140. By rotating the knob 147 in one direction, the switch 86 is closed and by rotating the knob 147 in the opposite direction the switch 96 is closed. Consequently, when the knob 147 is rotated in one direction and then another direction, both switches 86—96 are closed so that when the switch 86 is automatically opened, then the warming element 94 will still remain energized to keep the substance being processed in a warm usable condition. The relative vertical positions of the buttons 92—115 and/or their stems 75—113 serve as visual signal indicators of the cycle or status of heat generator operation at any given observation.

In the present embodiment, the casing 142 extends upwardly from the horizontal rim 146 to present a circular neck 148 terminating in an outward flare 149. The heating element 95 is confined by a circular casing 150 (Figure 3) to terminate upwardly in an outward flare 151 spaced from the casing flare 149 to retain the pot or coffee maker such as the lower vessel 152 (Figure 1) from touching the casing flare 149 or any part of the casing 142. The heating element casing 150 is mounted on the cradle 12—13 so that it is full floating relative thereto as will presently appear.

The heating element holder 95 with its casing 150 has, in this instance, an equidistant three point mount confronting the cradle 12—13 to preferably though not essentially align the center of gravity of the heating element holder 95 with that of the cradle arms 12—13 when the heating element holder 95 is in a true horizontal plane. The mounting means preferably though not essentially comprises a pair of depending cylindrical posts 153—154 (Figures 4 and 5) which extend from the bottom of the heating element holder and casing 95—150. The cylindrical posts 153—154 terminate downwardly in reduced rods 155 which define a fulcrum-like sharp edge peripheral shoulder 156 which rest on the cradle arm 12 around the apertures 157—158 which are sized to freely receive the reduced rods 155 therein of the posts 153—154. The reduced rods have transverse cotter-pin receiving holes 159 therein to preclude the accidental detachment of the heating element holder 95 and casing 150.

Figure 13:
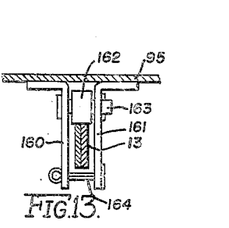
Figure 13 is a fragmentary sectional view in elevation of the cradle roller mount taken substantially along line XIII—XIII of Figure 7.

The third supporting point of the mount for the heater element holder 95 comprises, in this instance, spaced bracket plates 160—161 (Figure 13) attached to the bottom plate of the heating element 95 to straddle the cradle arm 13 and support a roller 162 on a pin 163 therebetween in confronting contacting relation with the top edge of the cradle arm 13, thereby permitting relative movement therebetween as the cradle arms 12—13 pivot relative to each other. A cotter pin 164 extends between the bracket plates 160—161 below the cradle arm 13 to preclude accidental detachment thereof. It should be noted that while the mount for the heater element holder 95 has three supporting points 153—154—162, the cradle arms 12—13 have four supporting points 14—15—26—27 which arrangement together with the pivotal cradle arms 12—13 renders the vibration responsive instrumentalities operative even though the heating element holder 95, cradle arms 12—13, and the base 10 are off their true vertical center. This could come about by placing the base 10 on a table surface that is not level.

The lead wires 165 (Figures 6 and 8) connect to a plug for attachment to any lighting circuit. These wires 165 connect to a terminal base bracket 168 (Figure 6) from which the suitable connections can be made to the switch blocks 87—119, and then to the heating elements 93—94 through leads 167, 168, and 169. The function of the instrumentalities will now be described in connection with a coffee-maker of the drip type for illustrative purposes only, and should not be construed as a limitation of the uses to which the teachings of the present invention can be put. The coffee pot 152 is filled with water to make the desired cups of coffee, and the funnel 170 with its central coffee stop 171 is supported thereon in the customary manner. Coffee of sufficient quantity is placed in the funnel 170 around the stop 171 which permits the flow of water and vapor upwardly therearound, but retains the coffee thereabove. The heating or processing is now ready to be initiated.

The weight of the coffee maker 152—170 together with its contents will vary greatly and will compress the spring 23 commensurate with its total weight. This will cause the heating element holder 95 and cradle arms 12—13 to descend to a position dependent upon the weight. The initial setting of the starting mechanism is not, however, influenced by the varying position of these instrumentalities because the lever 34 is automatically preset relative thereto. The timing mechanism is operable by the lever 34 that is self-adjusted through its friction connected ear 35 with the cradle arm 13. The loaded heating element holder 95 resting on the cradle arms 12—13 presets the connection of the lever 34 therewith independent of the timing and switch setting instrumentalities. Consequently, the attendant before or after the placement of the substance on the heating element holder 95 can set the mechanism by turning the knob 147 in a counterclockwise direction (viewed from Figure 1). This causes the shaft 120 to rotate the pin 124 (Figure 17) against the pin 126 to elevate the hub 73 which brings the insulator pin 84 up against the normally spaced switch terminals 86 to close the circuits to both heating elements 93—94. Simultaneously therewith the rotation of the shaft 120 causes the edge 134 of the plate sector 133 to engage the pin 135 (Figure 12) to rotate the plate sector 128 in a clockwise direction. The shaft 120 returns to its initial position after each actuation thereof under the influence of either spring 130 or 136 depending upon the directional actuation or rotation thereof to close switch terminals 86 or 96. The shaft 120 reaches its limit of movement in either direction when the pins 126 or 127 have elevated the stem hubs 73 or 14 so that their shoulders 74 or 112 engage the bracket flanges 76 or 114 (Figure 17).

The elevation of the trip lever 57—63 tensions or loads the spring 59 and rotates the gear shaft 53 in a counterclockwise direction (view from Figure 10) relative to the gear 52 which is frictionally attached thereto. Nothing will happen and the mechanism will remain in this position until enough heat is generated by the heating elements 93—94 and transferred to the coffee maker 152—170 to cause the water in the vessel 152 to boil. The boiling of the water creates turbulence in the vessel 152, thereby effecting a vibration or jiggling movement that causes the cradle 12—13 to move up and down along the fulcrum line of contact 29 of the pivotal cradle arms 12—13. Consequently, the vibration translating lever 34 will oscillate the escapement pawl pins 47—48 to permit the escapement spring 59 to intermittently operate the escapement wheels 49 and its operatively connected elements 51—52—53—55 and gear sector 56, the latter simultaneously lowering the trip lever 57—63 until engagement and downward displacement of the lever 65 is effected. The friction in the connector pin 36 establishing the friction between the lever ear 35 and cradle arm 13 is sufficient to transmit the vibrations of the cradle 12—13, but is insufficient to sustain the initial loaded displacement of the cradle arm 13, thereby automatically presetting the lever 13.

This releases the actuator lever 82 so that the insulator pin 84 will be displaced downwardly responsive to the spring 90 (Figure 14) to remove it from the path of the resilient switch terminals 86 which are permitted to separate to their normal position to open the circuits to the heater elements 93—94, thereby shutting off the electric current controlled by switch 86 and any further heat generation through both heating elements 93—94. The coffee is now fully prepared in accordance with the drip method which is well known and understood and requires no further explanation. The coffee is now ready for serving and the electric current has been completely shut off unless the switch 96 was also previously closed as hereinafter described. Should the attendant desire to keep the coffee at a warm temperature for delayed serving, then it is only necessary to rotate the knob 147 in a rotary clockwise direction (view from Figure 1) so that the pin 125 (Figure 17) will engage the pin 127 to elevate the hub 111 and bring the insulator pin 97 (Figure 15) against the switch 96 to close the circuit to the warming coil or heating element 94. The warming can continue until the attendant depresses the knob 115.

Now, then, should the attendant have desired in advance to prepare the coffee and thereafter keep it warm for delayed serving without intervention by the attendant, then the knob 147 could have been initially turned in a clockwise direction to elevate the button 92 and then reverse the rotation of the knob 147 to also elevate the knob 115 in advance of processing the coffee. This would result in the automatic complete preparation of the coffee and keeping the completed coffee warm until the attendant depresses the button 115. For that matter, the mechanism controlling the subsequent warming of the substance being processed, does not effect the initial processing so that the warming controls could be entirely dispensed with in certain models depending upon the dictates of commercial practice. While one form of control and operating characteristics have been illustrated, the teachings of the present invention could be applied to percolator and other methods of coffee preparation and to the processing of innumerable other substances which would set up movement responsive to any predetermined treatment that is within the dictates of commercial practice.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In the processing of substances with the application of heat, the combination with a heat generator, of means for yieldingly sustaining said heat generator, said heat generator being placed in motion by the turbulence caused in the substance supported thereon for application of heat thereto, movement responsive timing means operatively connected to said heat generator for controlling the operation thereof, and heat generator control means responsive to said timing means to reduce the rate of heat produced by said generator.

2. In the processing of substances with the application of heat, the combination with a heat generator, of a cradle comprising pivotal arms movable relative to each other for yieldingly sustaining said heat generator, said cradle being placed in motion by the turbulence caused in the substance supported by said heat generator for the application of heat thereto, movement responsive timing means operatively connected to said cradle, and heat generator control means responsive to said timing means to reduce the rate of heat produced by said generator.

3. In the processing of substances with the application of heat, the combination with a heat generator, of a movable cradle comprising pivotal arms for yieldingly sustaining said heat generator, said cradle being placed in motion by the turbulence caused in the substance supported by said heat generator for the application of heat thereto, movement responsive timing means, movement translating means operatively connected between said cradle and timing means, an adjustable connection between said movement translating means and said cradle, and heat generator control means responsive to said timing means to render said heat generator inoperative.

4. In the processing of substances with the application of heat, the combination with a heat generator, of a movable cradle for yieldingly sustaining said heat generator, said cradle being placed in motion by the turbulence caused in the substance supported by said heat generator for the application of heat thereto, movement responsive timing means, movement translating means operatively connected between said cradle and said timing means, an adjustable connection between said movement translating means and said cradle to render said timing means operative irrespective of the initial position of said heat generator with the substance supported thereon, and heat generator control means responsive to said timing means to vary the effect of said heat generator to a predetermined extent.

5. In the processing of substances with the application of heat, the combination with a heat generator, of a movable cradle for yieldingly sustaining said heat generator, a floating connection between said heat generator and cradle, said cradle being placed in motion by the turbulence caused in the substance supported by said heat generator for the application of heat thereto, movement responsive timing means operatively connected to said cradle, and heat generator control means responsive to said timing means to vary the effect of said heat generator to a predetermined extent.

6. In the processing of substances with the application of heat, the combination with a heat generator, of a movable cradle comprising relatively movable elements for yieldingly sustaining said heat generator, a floating connection between said heat generator and cradle, said cradle being placed in motion by the turbulence caused in the substance supported by said heat generator for the application of heat thereto, movement responsive timing means operatively connected to said cradle, and heat generator control means responsive to said timing means to render said heat generator inoperative.

7. In the processing of substances with the application of heat, the combination with a heat generator, of a movable cradle comprising pivotal arms for yieldingly sustaining said heat generator, a floating connection between said heat generator and cradle, said cradle being placed in motion by the turbulence caused in the substance supported by said heat generator for the application of heat thereto, movement responsive timing means operatively connected to said cradle, self-adjusting means between said cradle and timing means to render the latter operative irrespective of the initial position of said heat generator with the substance supported thereon, and switching means responsive to said timing means to control the operation of said heat generator.

8. In a control for operating instrumentalities, the combination with operating instrumentalities, of switch means for controlling the operation of said instrumentalities, a movable cradle responsive to the vibration of said instrumentalities, timing means for operating said switch means, and means interposed between said cradle and timing means to translate the movement of said cradle to said timing means for controlling the operation of the latter to actuate said switch means to render said instrumentalities inoperative.

9. In the processing of substances with the application of heat, the combination with a heat generator, of a vertical movable cradle comprising pivotal arms for yieldingly sustaining said heat generator, said cradle being placed in motion by the turbulence caused in the substance supported by said heat generator transmitting heat thereto, movement responsive timing means operatively connected to said cradle, heat generator control means responsive to said timing means to reduce the rate of heat produced by said generator means frictionally connected to said cradle for transmitting the movement thereof to said timing means irrespective of the initial position of said heat generator with the substance supported thereon, and means for simultaneously rendering said heat generator operative through said control means and setting said timing means.

10. In the processing of substances with the application of heat, the combination with a heat generator, of a vertical movable cradle comprising pivotal arms for yieldingly sustaining said heat generator, a floating connecting support between said heat generator and cradle, said cradle being placed in motion by the turbulence caused in the substance supported by said heat generator for the application of heat thereto, movement responsive timing means operatively connected to said cradle, heat generator control means responsive to said timing means to render said heat generator inoperative, a self-adjusting connection between said timing means and cradle to conform to variable initial positions of said heat generator with the substance supported thereon, and means for simultaneously setting said timing means and rendering said heat generator operative through said control means.

11. In the processing of substances with the application of heat, the combination with a heat generator, of means for yieldingly sustaining said heat generator, said heat generator being placed in motion by the turbulence caused in the substance supported by said heat generator for the application of heat thereto, movement responsive timing means operatively connected to said heat generator, heat generator control means responsive to said timing means to render said heat generator inoperative, a means for initially setting said timing means and simultaneously rendering said heat generator operative through said control means, and manual means for rendering said last named means inoperative to deenergize said heat generator prior to the complete operation of said timing means.

12. In the processing of substances with the application of heat, the combination with a heat generator, of a vertical movable cradle comprising pivotal arms, spring means to normally support said cradle pivotal arms in an upwardly converging relation for yieldingly sustaining said heat generator, a floating connecting support between said heat generator and cradle, said cradle being placed in motion by the turbulence caused in the substance supported by said heat generator for the application of heat thereto, movement responsive timing means, lever means operatively connected to said cradle for controlling said movement responsive timing means, heat generator control means responsive to said timing means to render said heat generator inoperative, and means for simultaneously setting said timing means and rendering said heat generator operative through said control means.

13. In the processing of substances with the application of heat, the combination with an electric heating element, of a movable cradle for yieldingly sustaining said electric heating element, an electric circuit including a normally open switch therein, said cradle being placed in motion by the turbulence caused in heating the substance to a predetermined degree by said electric heating element, movement responsive timing means operatively connected to said cradle, means for closing said switch, and other means interposed between said timing means and said switch closing means to retract said switch closing means for breaking the circuit to said heating element responsive to a predetermined operation of said timing means by said cradle.

14. In the processing of substances with the application of heat, the combination with an electric heating element, of a movable cradle comprising pivotal arms for yieldingly sustaining said electric heating element, an electric circuit including a normally open switch therein, said cradle being placed in motion by the turbulence caused in heating the substance to a predetermined degree by said electric heating element, movement responsive timing means operatively connected to said cradle, means for closing said switch, and other means interposed between said timing means and said switch closing means to retract said switch closing means for breaking the circuit to said heating element responsive to a predetermined operation of said timing means by said cradle.

15. In the processing of substances with the application of heat, the combination with an electric heating element, of a movable cradle comprising pivotal arms for yieldingly sustaining said electric heating element, an electric circuit including a normally open switch therein, a floating connecting support between said heat generator and cradle, said cradle being placed in motion by the turbulence caused in heating the substance to a predetermined degree by said electric heating element, movement responsive timing means operatively connected to said cradle, means for closing said switch, and other means interposed between said timing means and said switch closing means to retract said switch closing means for breaking the circuit to said heating element responsive to a predetermined operation of said timing means by said cradle.

16. In the processing of substances with the application of heat, the combination with an electric heating element, of a movable cradle comprising pivotal arms, spring means to normally support said cradle pivotal arms in an upwardly converging relation for yieldingly sustaining said electric heating element, an electric circuit including a normally open switch therein, a floating connecting support between said heat generator and cradle, said cradle being placed in motion by the turbulence caused in heating the substance to a predetermined degree by said electric heating element, movement responsive timing means operatively connected to said cradle, means for closing said switch, and other means interposed between said timing means and said switch closing means to retract said switch closing means for breaking the circuit to said heating element responsive to a predetermined operation of said timing means by said cradle.

17. In the processing of substances with the application of heat, the combination with an electric heating element, of a movable cradle for yieldingly sustaining said electric heating element, said heating element comprising separate coils so that both serve as a heating element and one coil serves as a warming coil, an electric circuit including normally open switches therein, one of said switches serving to regulate both of said coils the other of said switches in said circuit to regulate only said warming coil, said cradle being placed in motion by the turbulence caused in heating the substance to a predetermined degree by said electric heating element, movement responsive timing means operatively connected to said cradle, separate means for closing both of said switches, other means interposed between said timing means and said switch closing means to retract one of said switch closing means for breaking the circuit through said first named switch to said heating coils responsive to a predetermined operation of said timing means by said cradle, and manual means to retract the other of said switch closing means to said warming coil.

18. In the processing of substances with the application of heat, the combination with an electric heating element, of a movable cradle for yieldingly sustaining said electric heating element, said heating element comprising separate coils so that both serve as a heating element and one coil will serve as a warming coil, an electric circuit including normally open switches therein, one of said switches serving to regulate both of said coils the other of said switches in said circuit to regulate only said warming coil, said cradle being placed in motion by the turbulence caused in heating the substance to a predetermined degree by said electric heating element, movement responsive timing means operatively connected to said cradle, separate means for closing both of said switches, other means interposed between said timing means and said switch closing means to effect the retraction thereof for breaking the circuit through said first named switch to both of said heating coils responsive to a predetermined operation of said timing means by said cradle, means for initially setting said timing means and simultaneously actuating said first named switch closing means, and means for retracting said switch closing means to said warming coil.

WILLIAM H. HUENERGARDT.